(12) United States Patent
Mohlin

(10) Patent No.: US 8,109,167 B2
(45) Date of Patent: Feb. 7, 2012

(54) GEAR BOX FOR A MOTOR VEHICLE

(75) Inventor: Mikael Mohlin, Kungälv (SE)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 12/414,966

(22) Filed: Mar. 31, 2009

(65) Prior Publication Data

US 2009/0241729 A1    Oct. 1, 2009

(30) Foreign Application Priority Data

Mar. 31, 2008    (GB) .................................. 0805825.7

(51) Int. Cl.
*F16H 3/08* (2006.01)
(52) U.S. Cl. ........................................... 74/331
(58) Field of Classification Search ........................ None
See application file for complete search history.

(56) References Cited

U.S. PATENT DOCUMENTS

| | | | | |
|---|---|---|---|---|
| 7,395,735 B2 * | 7/2008 | Enstrom et al. | ................. | 74/661 |
| 7,469,613 B2 * | 12/2008 | Krauss et al. | ................... | 74/340 |
| 7,621,195 B2 * | 11/2009 | Hattori | ........................... | 74/331 |
| 7,987,739 B2 * | 8/2011 | Okadome et al. | .............. | 74/331 |
| 2009/0266191 A1 * | 10/2009 | Remmler | ........................ | 74/331 |

FOREIGN PATENT DOCUMENTS

DE    19923185 A1    12/2000

* cited by examiner

*Primary Examiner* — Dirk Wright
(74) *Attorney, Agent, or Firm* — Ingrassia Fisher & Lorenz, P.C.

(57) ABSTRACT

A gearbox is provided for a motor vehicle that includes, but is not limited to at least a first input shaft and at least a first output shaft. The first input and output shafts carrying at least a first drive gearwheel and a first driven gearwheel, respectively, for establishing a forward gear ratio, and a second drive gearwheel and a second driven gearwheel, respectively, coupled by a 10 first intermediate gearwheel for establishing a reverse transmission ratio. The second driven gearwheel meshes with a third driven gearwheel on a second output shaft for establishing a further forward gear ratio.

12 Claims, 4 Drawing Sheets

US 8,109,167 B2

GEAR BOX FOR A MOTOR VEHICLE

CROSS-REFERENCE TO RELATED APPLICATION

This application claims priority to Great Britain Patent Application No. 0805825.7, filed Mar. 31, 2008, which is incorporated herein by reference in its entirety.

TECHNICAL FIELD

The present invention relates to a gearbox for a motor vehicle comprising at least a first input shaft and at least a first output shaft. The first input and output shafts carrying at least a first drive gearwheel and a first driven gearwheel, respectively, for establishing a forward transmission ratio, and a second drive gearwheel and a second driven gearwheel, respectively, coupled by a first intermediate gearwheel for establishing a reverse transmission ratio.

BACKGROUND

In recent times, gearboxes having coaxial input shafts as disclosed (e.g., in DE 199 23 185 A1) have been the subject of intensive development efforts, due to the expectation that in combination with a double clutch for driving the two input shafts they will allow to combine advantages of conventional automatic transmissions, such as easy handling and interruption-free shifting, and of conventional manual transmissions such as fast shifting and high power efficiency.

The double clutch required for the operation of a gearbox having coaxial input shafts occupies considerable space, so that a gearbox of this type is difficult to integrate in an engine compartment of a compact motor vehicle. This causes an increasing demand for gearboxes which can accommodate a high number of gears in spite of reduced dimensions, in particular in the longitudinal direction of the shafts.

In view of the foregoing, at least one object of the present invention is to provide a gearbox capable of satisfying this demand. In addition, other objects, desirable features, and characteristics will become apparent from the subsequent detailed description and the appended claims, taken in conjunction with the accompanying drawings and this background.

SUMMARY

The at least object, other objects, desirable features, and characteristics, are achieved by a gearbox for a motor vehicle comprising at least a first input shaft and at least a first output shaft. The first input and output shafts carrying at least a first drive gearwheel and a first driven gearwheel, respectively, for establishing a forward transmission ratio, and a second drive gearwheel and a second driven gearwheel, respectively, coupled by a first intermediate gearwheel for establishing a reverse transmission ratio. The second driven gearwheel meshes with a third driven gearwheel on a second output shaft for establishing a further forward gear ratio.

Since the further gear ratio is subject to higher friction loss than a gear ratio established by meshing gearwheels of input and output shafts, it is preferred that the further forward gear ratio is the first gear. Here, the impact of the additional friction loss is smaller than with any higher gear.

Preferably, the gearbox comprises a second intermediate gearwheel rigidly coupled to the first intermediate gearwheel, and the first intermediate gearwheel meshes with the second driven gearwheel and the second intermediate gearwheel meshes with the second drive gearwheel. This causes the second drive gearwheel and the second driven gearwheel to be axially offset with respect to each other, and reduces constraints on the radii of these gearwheels.

Further, the second intermediate gearwheel should have a larger radius than the first intermediate gearwheel. In a gearbox where the first gear or the reverse gear is established by a pair of meshing gearwheels only, the driven gearwheel must be rather large. If the intermediate gearwheels are used, and if the second intermediate gearwheel is larger than the first, the driven gearwheel may also be made smaller, allowing a compact design of the gearbox.

The intermediate gearwheels may be carried by one of the output shafts. In this way the number of components of the gearbox can be kept small, but it may be difficult to satisfy constraints on the radii of the gearwheels which may be imposed (e.g., by a required spacing between the various gear ratios).

If the number of output shafts is at least three, the intermediate gearwheels are preferably carried by a third output shaft distinct from the first and second ones. In that case, a synchronizer should be provided for selectively locking the intermediate gearwheels to the third output shaft.

In order to reduce constraints on gearwheel radii, it may be desirable to provide a layshaft that carries the intermediate gearwheels.

Although the present invention is not restricted to a gearbox in which the first input shaft is hollow and a second input shaft extends coaxially through the first input shaft, this type of gearbox is a preferred field of application of the invention for the reasons given above.

In order to enable switching between consecutive gears without interrupting torque flow, drive gearwheels of one of the two input shafts should be used for establishing odd-numbered gears and drive gearwheels of the other input shaft for establishing even-numbered gears.

Preferably, a third output shaft is provided. In that case, the axial dimension of the gearbox may be reduced still further if at least one drive gearwheel meshes with driven gearwheels of the first and third output shafts.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
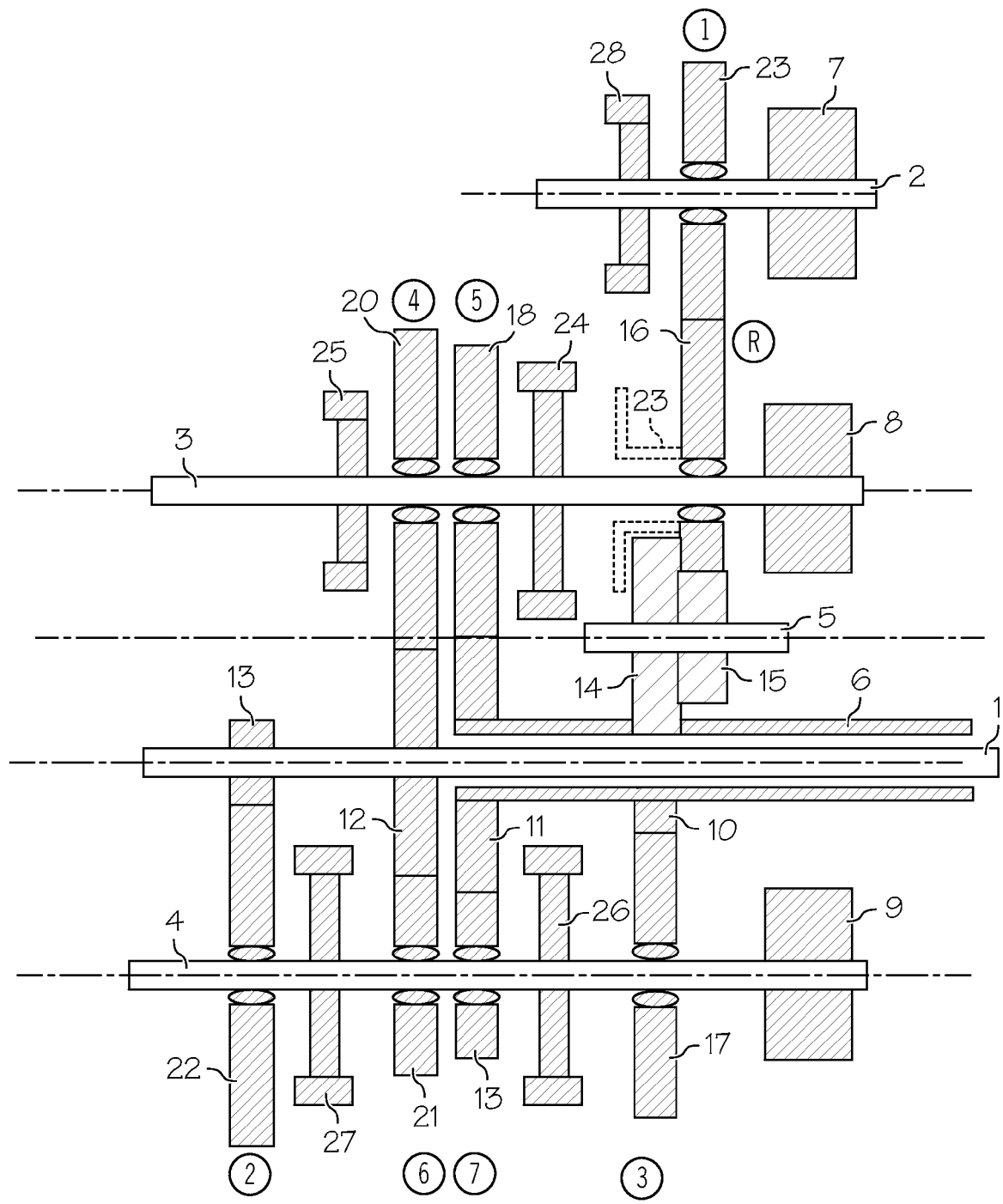
FIG. 1 is an axial cross section of a gearbox according to a first embodiment of the invention.

The gearbox illustrated in FIG. 1 has a solid input shaft 1, output shafts 2, 3, 4 and a layshaft 5, rotatably held in bearings of a gearbox casing, not shown. Part of the solid input shaft 1 is surrounded coaxially by a hollow input shaft 6. The two input shafts are selectively coupled to a combustion engine by a double clutch, not shown. The three output shafts carry output pinions 7, 8, 9, all of which mesh with a same ring gear, not shown.

Hollow input shaft 6 carries two drive gearwheels 10, 11. Gearwheel 10 meshes with a first intermediate gearwheel 14 of layshaft 5. A second intermediate gearwheel 15 of layshaft 5 drives a gearwheel 16 rotatably mounted on output shaft 3. Gearwheel 16, in turn, drives a gearwheel 23 rotatably mounted on output shaft 2. Besides, gearwheel 10 meshes with a gearwheel 17 rotatably mounted on output shaft 4.

Gearwheel 11 is engaged with driven gearwheels 18, rotatably mounted on output shafts 3, 4, 20 respectively. Solid input shaft 1 carries two drive gearwheels 12, 13. Gearwheel 12 is engaged with driven gearwheels 20, 21 rotatably mounted on output shafts 3, 4, respectively. Gearwheel 13 meshes with a driven gearwheel 22 of output shaft 4.

The driven gearwheels 17 to 23 have synchronizers 24 to 28 associated to them for selectively locking one or the other of them to the output shaft carrying it. In the first gear, only synchronizer 28 is engaged, so that torque is transmitted from hollow input shaft 6 via gearwheels 10, 14, 15, 16, 23 to output shaft 2.

The second gear is established by engaging synchronizer 27 with gearwheel 22, so that torque is transmitted from solid input shaft 1 to output shaft 4 via gearwheels 13, 22.

Although gearwheel 13 is the smallest of all drive gearwheels, it can be used for the second gear and not for the first, as might be expected, because in the first gear, the speed of rotation is reduced at least two pairs of meshing gearwheels namely 10 and 14, 15 and 16, and might be reduced also between gearwheels 16 and 23, if desired, and because gearwheel 15 is smaller than gearwheel 14.

Gearwheel 10 is also used for the third gear, by locking gearwheel 17 to output shaft 4 using synchronizer 26.

The fourth gear is established by locking gearwheel 20, driven by gearwheel 12, to output shaft 3 using synchronizer 25.

Drive gearwheel 12 is also used for the sixth gear, by locking gearwheel 21 to output shaft 4 using synchronizer 27. A difference in transmission ratios of fourth and sixth gears is caused by different distances between input shaft 1, on the one hand, and output shafts 3, 4, on the other.

Similarly, drive gearwheel 11 is used in fifth and seventh gears by locking either gearwheel 18 to output shaft 3 using synchronizer 24 or gearwheel 19 to output shaft 4 using synchronizer 26. Synchronizer 24 is also used for establishing the reverse gear, by locking gearwheel 16 to output shaft 3.

As can be seen in FIG. 1, gearwheel 14 extends between gearwheel 16 and its associated synchronizer 24, so that a locking sleeve of synchronizer 24 must either have a rather small radius in order to pass by gearwheel 14 and engage a toothing of gearwheel 16, or gearwheel 16 must be solidly connected to a toothing by a sleeve 29 spanning the width of gearwheel 14, as shown in phantom in FIG. 1. This problem is avoided in the embodiment shown in FIG. 2.

Figure 2:
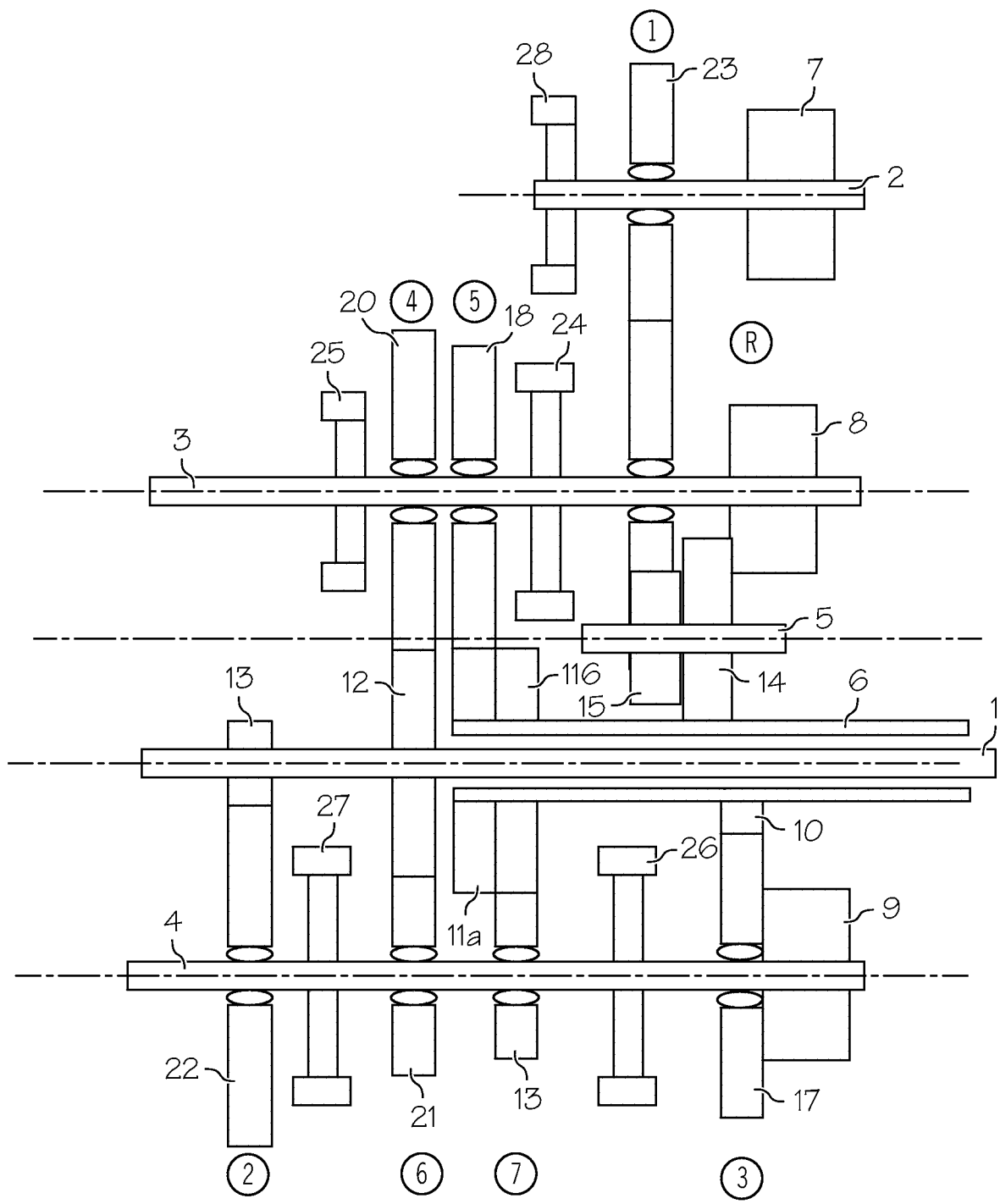
FIG. 2 is an axial cross section of a gearbox according to a second embodiment of the invention.

The second embodiment illustrated in FIG. 2 is identical to the first embodiment in most respects, except for the order of intermediate gearwheels 14, 15. Here, the smaller one of the two intermediate gearwheels is facing synchronizer 24, so that it can freely accede to gearwheel 16. Due to the positions of gearwheels being swapped, gearwheel 16 is placed further left than in the embodiment of FIG. 1, and in order to provide sufficient space for synchronizer 24, gearwheel 18 is displaced to the left, too. Since gearwheels 10, 17 are displaced to the right, gearwheel 11 must be made broader than in the first embodiment, and gearwheels 18, 19 mesh with different zones of the circumference of gearwheel 11. In fact, gearwheel 11 may be split into two gearwheels 11a, 11b, which might even, if desired, have different radii.

Figure 3:
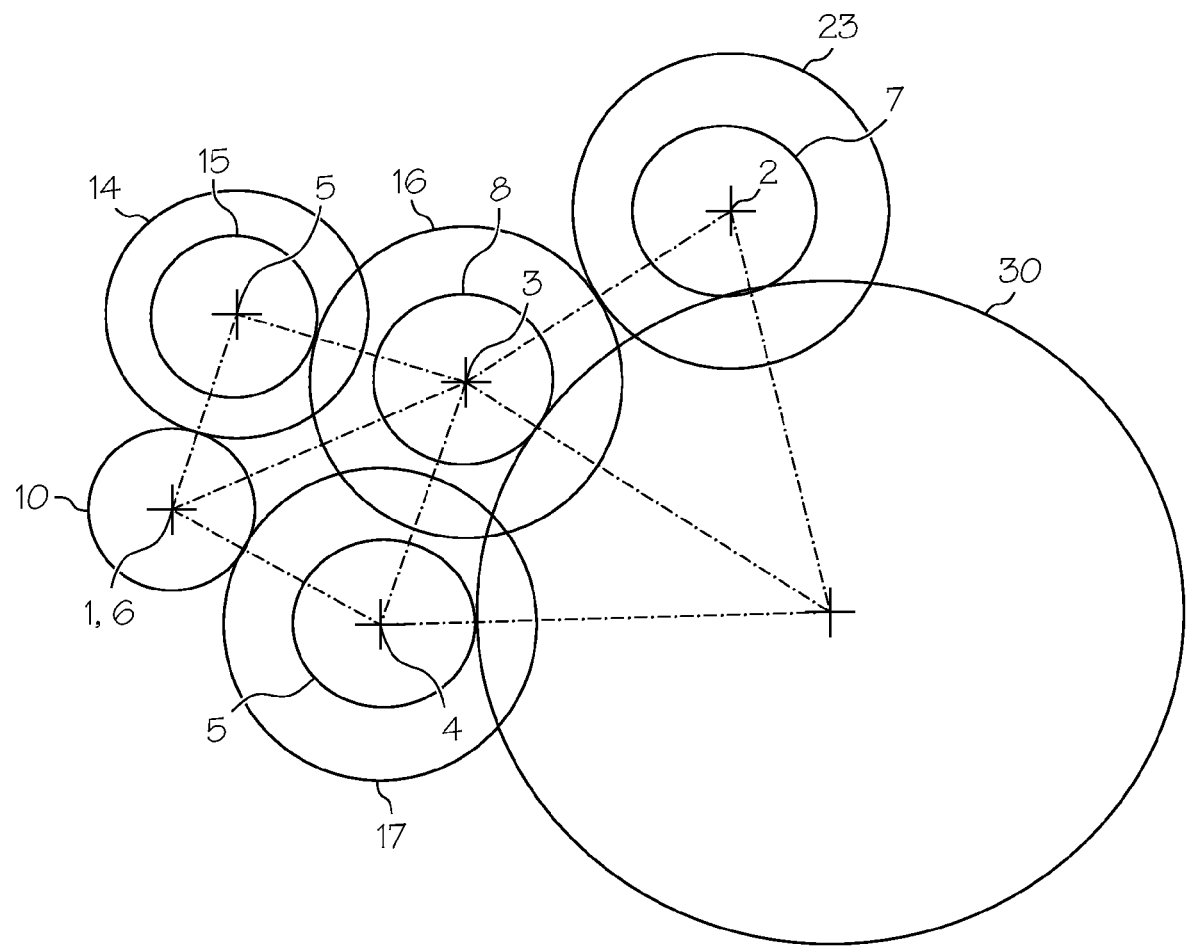
FIG. 3 is a radial cross section of a gearbox according to the first or second embodiment.

FIG. 3 illustrates a schematic cross section of the gearboxes of FIGS. 1 and 2 perpendicular to the input shafts 1 to 6. Selected gearwheels are shown and identified by their above-defined reference numerals, not all of which are located in the same plane. Reference numeral 30 refers to the ring gear engaged by pinions 7, 8, 9.

Figure 4:
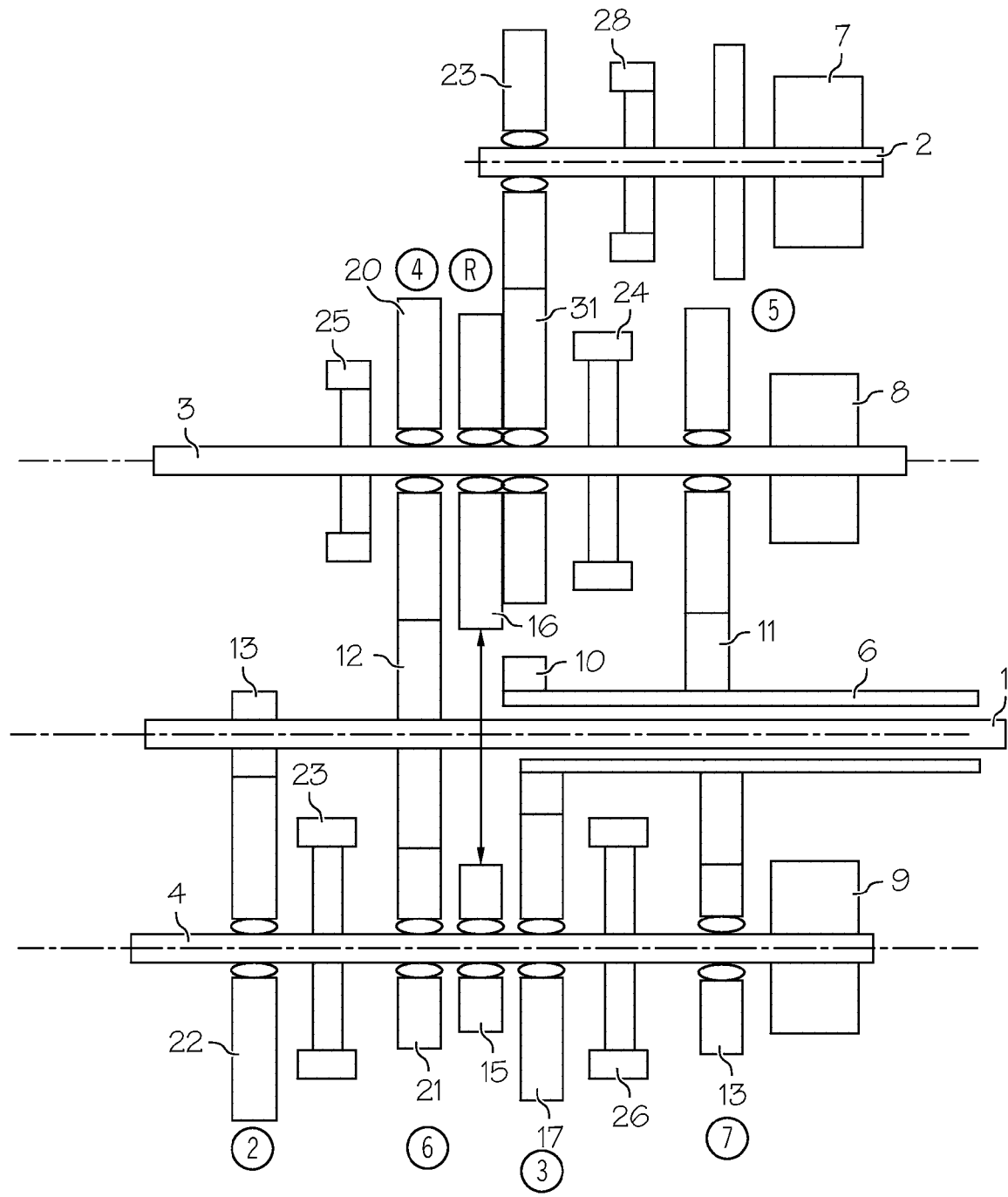
FIG. 4 is an axial cross section of a gearbox according to a third embodiment of the invention.

FIG. 4 is an axial cross section similar to FIGS. 1 and 2, of a third embodiment of the invention. In this embodiment, second to seventh gears are established just in the same way as in the embodiments of FIGS. 1 and 2, so that a description thereof will not be repeated.

The gearbox of FIG. 4 has no more lay shaft, there are only input shafts 1, 6 and output shafts 2, 3, 4. The functions of intermediate gearwheel 14 is here fulfilled by gearwheel 17, which has intermediate gearwheel 15 rigidly coupled to it. Since gearwheel 10 is here placed at the end of hollow shaft 6, and gearwheel is placed beyond this end, gearwheel 16 can be prevented from interfering with the input shafts in spite of its large diameter.

The fact that gearwheel 17 is used for the third gear and for the reverse gear imposes certain constraints on the transmission ratio the reverse gear can have. In order to avoid such constraints for the transmission ratio of the first gear, a further gearwheel is introduced, which is rigidly coupled to gearwheel 16 on output shaft 3, and which meshes with gearwheel 23 of output shaft 2.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A gearbox for a motor vehicle, comprising:
   a first input shaft carrying a first drive gearwheel;
   a first output shaft carrying a first driven gearwheel for establishing a forward gear ratio with the first input shaft; and
   a second drive gearwheel carried by said first input shaft and a second driven gearwheel coupled by a first intermediate gearwheel for establishing a reverse transmission ratio:
   wherein the second driven gearwheel is adapted to mesh with a third driven gearwheel on a second output shaft for establishing a further forward gear ratio.

2. The gearbox of claim 1, wherein said further forward gear ratio is a first gear.

3. The gearbox of claim 1, further comprising a second intermediate gearwheel rigidly coupled to said first intermediate gearwheel:
   wherein said first intermediate gearwheel is adapted to mesh with said second driven gearwheel and the second intermediate gearwheel is adapted to mesh with said second drive gearwheel.

4. The gearbox of claim 3, wherein the second intermediate gearwheel has a larger radius than the first intermediate gearwheel.

5. The gearbox of claim 3, wherein said first intermediate gearwheel and said second intermediate gearwheel are carried by a layshaft.

6. The gearbox of claim 3, wherein said first intermediate gearwheel and said second intermediate gearwheel are carried by an output shaft.

7. The gearbox of claim 6, wherein the output shaft carrying said first intermediate gearwheel and said second intermediate gearwheel is a third output shaft distinct from said first output shaft and said second output shaft.

8. The gearbox of claim 7, wherein at least one of said first drive gearwheel and said second driven gearwheel is adapted to mesh with a driven gearwheel of the first output shaft and a third output shaft.

9. The gearbox of claim 6, wherein a synchronizer is adapted to lock the first intermediate gearwheel and the second intermediate gearwheel to a third output shaft.

10. The gearbox of claim 5, wherein at least one of said first drive gearwheel and said second driven gearwheel is adapted to mesh with a driven gearwheel of said first output shaft and of a third output shaft.

11. The gearbox of claim 1, wherein the first input shaft is hollow and a second input shaft extends coaxially through said first input shaft.

12. The gearbox of claim 11, wherein said first drive gearwheel and said second driven gearwheel of one of said first input shaft and said second input shaft establishes odd-numbered gears and drive gearwheels of other input shaft establishes even-numbered gears.

* * * * *